United States Patent [19]

Topcik

[11] Patent Number: 4,722,961
[45] Date of Patent: Feb. 2, 1988

[54] ROOFING MEMBRANES
[75] Inventor: Barry Topcik, Bridgewater, N.J.
[73] Assignee: Union Carbide Corporation, Danbury, Conn.
[21] Appl. No.: 874,389
[22] Filed: Jun. 16, 1986
[51] Int. Cl.$^4$ .................. C08L 51/06; C08L 23/16
[52] U.S. Cl. .................. 524/504; 524/484; 524/487; 524/521; 525/72; 525/209
[58] Field of Search .................. 525/71, 72, 209; 524/504, 521

[56] References Cited

U.S. PATENT DOCUMENTS 4,558,094 12/1985 Deguchi et al. .................. 525/72

FOREIGN PATENT DOCUMENTS 2546172 11/1984 France .
0008355 1/1976 Japan .................. 525/504
0056641 5/1979 Japan .................. 525/504

Primary Examiner—Wilbert J. Briggs, Sr.
Attorney, Agent, or Firm—Saul R. Bresch

[57] ABSTRACT

A roofing membrane composition comprising:
(a) a first hydrolyzable polyolefin having a density less than or equal to 0.92 selected from the group consisting of (i) a copolymer of ethylene or propylene and silane and (ii) a silane modified polyethylene, polypropylene, or ethylene/propylene copolymer wherein, in (i) or (ii), the silane is present in an amount of about 0.5 to about 10 percent by weight based on the weight of the first polyolefin, said first polyolefin being present in the composition in an amount of about 20 to about 90 percent by weight based on the weight of the composition;
(b) a second polyolefin selected from the group consisting of:
   (i) an ethylene-propylene-diene terpolymer rubber;
   (ii) a copolymer of ethylene and vinyl acetate; and
   (iii) a copolymer of ethylene and ethyl acrylate;
      said second polyolefin being present in the composition in an amount of about 10 to about 80 percent by weight based on the combined weight of the first and second polyolefins;
(c) a particulate filler selected from the group consisting of carbon black and non-black reinforcing fillers, and mixtures thereof; and
(d) an oil compound suitable for roofing membranes selected from the group consisting of paraffin oils, naphthenic oils, and liquid polybutene.

2 Claims, No Drawings

ROOFING MEMBRANES

TECHNICAL FIELD

This invention relates to filled polyolefin based compositions adapted to serve as roofing membranes.

BACKGROUND ART

Typical roofing membrane compositions contain 100 parts of ethylene-propylene-diene terpolymer rubber, 100 parts of carbon black, and 50 parts of paraffin oil. The composition is either calendered or extruded into a membrane and then cured at high temperatures using conventional vulcanization techniques, e.g., by wrapping the calendered sheets of roofing membrane continuously on drums and curing the sheets with steam.

Prior to vulcanization, rubber compositions are usually soft and deform readily during handling. Consequently, rubber compositions, which are not vulcanized, are not useful as roofing membranes. The vulcanization step adds, of course, to the cost of the roofing membrane.

DISCLOSURE OF THE INVENTION

An object of this invention, therefore, is to provide a roofing membrane composition, which does not have to be vulcanized, i.e., its physical properties are such that it will not deform during handling.

Other objects and advantages will become apparent hereinafter.

According to the present invention, the above object is met by a roofing membrane composition comprising:
(a) a first hydrolyzable polyolefin having a density less than or equal to 0.92 selected from the group consisting of (i) a copolymer of ethylene or propylene and silane and (ii) a silane modified polyethylene, polypropylene, or ethylene/propylene copolymer wherein, in (i) or (ii), the silane is present in an amount of about 0.5 to about 10 percent by weight based on the weight of the first polyolefin, said first polyolefin being present in the composition in an amount of about 20 to about 90 percent by weight based on the combined weight of the first and second polyolefins;
(b) a second polyolefin selected from the group consisting of;
  (i) an ethylene-propylene-diene terpolymer rubber, said terpolymer rubber containing about 30 to about 85 percent by weight ethylene, about 15 to about 70 percent by weight propylene, and about 1 to about 10 percent by weight diene, all percentages based on the weight of the terpolymer rubber;
  (ii) a copolymer of ethylene and vinyl acetate wherein the vinyl acetate is present in an amount of about 5 to about 45 percent by weight based on the weight of the copolymer; and
  (iii) a copolymer of ethylene and ethyl acrylate wherein the ethyl acrylate is present in an amount of about 5 to about 40 percent by weight based on the weight of the copolymer,
  said second polyolefin being present in the composition in an amount of about 10 to about 80 percent by weight based on the combined weight of the first and second polyolefins;
(c) a particulate filler selected from the group consisting of carbon black and non-black reinforcing fillers, and mixtures thereof, said filler being of sufficient particle size to provide reinforcement for roofing membranes and being present in the composition in an amount of about 10 to about 200 parts by weight per hundred parts by weight of the first and second polyolefins combined; and
(d) an oil type compound suitable for roofing membranes selected from the group consisting of paraffin oils, naphthenic oils, and liquid polybutene, said oil type compound being present in the composition in an amount of about 10 to about 100 parts by weight per hundred parts by weight of the first and second polyolefins combined.

DETAILED DESCRIPTION

In all cases, the first polyolefin has a density of less than or equal to 0.92, and preferably a density in the range of 0.86 to 0.92.

The copolymer of ethylene or propylene and silane can be prepared by the process described in U.S. Pat. No. 3,225,018, which is incorporated by reference herein. The silane is present in the range of about 0.5 to about 10 percent by weight based on the weight of the copolymer and preferably in the range of about 0.5 to about 4 percent by weight.

The silane modified polyethylene, polypropylene, or ethylene/propylene copolymer can be prepared by the technique described in examples I and II below. In these polymers, the silane is present in an amount of about 0.5 percent to about 10 percent by weight based on the weight of the polymer or copolymer and is preferably incorporated into the polymer or copolymer is an amount of about 0.5 to about 4 percent by weight. The silane used to modify the polymer or copolymer can be vinyl trimethoxy silane or vinyl triethoxy silane. If slower water cure or better shelf stability is desired, vinyl triisobutoxy silane or vinyl tris-(2-ethyl-hexoxy) silane can be used. In the ethylene/propylene copolymer, the portion of the copolymer derived from propylene is about 10 to about 50 percent by weight of the copolymer.

The ethylene-propylene-diene terpolymer rubber can be prepared as described in U.S. Pat. No. 3,835,201, which is incorporated by reference herein. The broad and preferred ranges of terpolymer rubber components in percent by weight based on the weight of the terpolymer rubber are about as follows:

| Component | Broad | Preferred |
| --- | --- | --- |
| ethylene | 30 to 85 | 50 to 75 |
| propylene | 15 to 70 | 20 to 40 |
| diene | 1 to 10 | 2 to 8 |

The diene can be a conjugated or non-conjugated diene containing 5 to 25 carbon atoms such as 1,4-pentadiene, 1,4-hexadiene, 1,5-hexadiene, dicyclopentadiene, cyclohexadiene, 1-vinyl-1-cyclopentene, and the alkylbicyclononadienes, indenes, and norbornenes. Ethylidene norbornene is an example of the latter. The non-conjugated dienes are preferred.

Copolymers of ethylene and vinyl acetate are well known and can be prepared by conventional techniques. The vinyl acetate is present in the copolymer in an amount of about 5 percent by weight to about 45 percent by weight based on the weight of the copolymer and is preferably present in an amount of about 10 percent by weight to about 40 percent by weight.

Copolymers of ethylene and ethyl acrylate are also well known and can be prepared by conventional processes. The ethyl acrylate is present in the copolymer in an amount of about 5 percent by weight to about 40 percent by weight based on the weight of the copolymer and is preferably present in an amount of about 10 percent by weight to about 35 percent by weight.

Sheets of the copolymer of ethylene and vinyl acetate and of ethylene and ethyl acrylate are superior to sheets of ethylene-propylene-diene terpolymer rubber in that they provide better heat welded splices.

The fillers used in the roofing membrane composition are selected because of their reinforcement capability, e.g., the addition of 50 parts by weight of a reinforcing filler such as carbon black to 100 parts by weight of an ethylene-propylene-diene terpolymer rubber will increase the tensile strength of the terpolymer rubber from about 400 psi to about 4000 psi, a tenfold increase. These fillers are introduced into the composition in particulate form; the particles have a size in the range of about 10 to about 500 millimicrons and preferably in the range of about 25 to about 100 millimicrons. Carbon black is used where a black roofing membrane is desired. Non-black fillers such as precipitated silica, clay, and magnesium silicate can also be used, as well as mixtures of carbon black and non-black fillers.

An oil type compound is also required in a roofing membrane composition. When reinforcing fillers such as carbon black are added to polymers such as those referred to above as the second polyolefin, the viscosity of the mixture becomes very high, thus reducing the capacity of the mixture to be worked into roofing membranes or any other product requiring flexibility. Therefore, unless the viscosity can be reduced, the amount of filler that can be mixed into the polymer is limited. The function of the oil type compounds is to reduce the viscosity of the mixture and also soften the polymer. As the oil type compounds are added to the composition, the amount of filler can be increased. Examples of oil type compounds are paraffin oils, naphthenic oils, and liquid polybutene. Liquid polybutene is considered to be more compatible with ethylene polymers and copolymers than paraffin oils.

The broad and preferred ranges of the first two composition components in percent by weight based on the combined weight of the first and second polyolefins are about as follows:

| Component | Broad | Preferred |
| --- | --- | --- |
| first polyolefin | 20 to 90 | 40 to 80 |
| second polyolefin | 10 to 80 | 20 to 60 |

The broad and preferred ranges of the second two composition components in parts by weight per 100 parts of first and second polyolefins combined are about as follows:

| Component | Broad | Preferred |
| --- | --- | --- |
| filler | 50 to 200 | 60 to 150 |
| oil type compound | 10 to 100 | 20 to 80 |

The first and second polyolefins are mixed together with the filler and oil type compound at a temperature in the range of about 75° C. to about 180° C. The preferred mixing temperature is in the range of about 100° C. to about 150° C. Additives, which are mentioned below, can be added initially (except for the catalyst) or after the above four components have been thoroughly mixed. Mixing can be effected in a Banbury or Brabender mixer or on a two roll mill. Processing is accomplished on a calender or in an extruder at a temperature in the range of about 100° C. to about 150° C., which is hot enough to flux the first polyolefin. The composition is made into slabs, as is usually done with rubber, or pelletized. In most rubber processing on a calender or in an extruder, the rubber compound is first warmed up to a temperature in the range of about 80° C. to about 100° C. on a two roll mill. It is at this point that the tin catalyst masterbatch (a mixture, for example, of polyethylene and dibutyl tin dilaurate) is introduced into the mixture of first and second polyolefins. In a sheet extrusion operation, pellets containing the first and second polyolefins and other components and additives are mixed with the tin catalyst masterbatch pellets and added to the extruder where the pellets are fluxed and the components intimately mixed together. After extrusion, the sheets are spliced together in larger sections and rolled onto a drum for shipment. If the catalyst content is maintained at a low enough level, very little cure will occur. Thus, additional heat sealed splices can be made at the site of installation as required. In any case, the sheets do not require the high temperature vulcanization needed for conventional roofing membranes.

The silane copolymer can be crosslinked by exposing the polymer to moisture. The crosslinking is accelerated in the presence of an appropriate catalyst such as dibutyl tin dilaurate, dioctyl tin maleate, stannous acetate, stannous octoate, lead naphthenate, zinc octoate, iron 2-ethyl hexoate, and other metal carboxylates. Further acceleration of crosslinking can be accomplished by adding a co-catalyst such as tetramethoxy titanate, tetraisopropyl titanate, tetramethyl titanate, or other organo titanates mentioned in U.S. Pat. No. 4,446,279, which is incorporated by reference herein.

If either the first or second polyolefins or both are left uncured, the silane/polyolefin copolymers and the silane modified polyolefins will cure after installation on long term exposure to moisture. As noted, this curing can be accelerated by the addition of a catalyst and co-catalysts. If curing of the second polyolefin is desired, vulcanizing agents such as sulfur and sulfur-bearing accelerators can be added. Sulfur-bearing accelerators, which are usually added in combination with the sulfur, include benzothiazyl disulfide and tetramethylthiuram monosulfide. Leaving one or the other or both uncured will provide sufficient uncured strength in the roofing membrane so that handling will not distort the sheets. After installation, the curable portion cures, providing the membrane with the strength needed to resist the environment, particularly the summer heat.

The catalyst can be introduced into the roofing membrane composition in an amount of about 0.05 to about 1 part by weight based on 100 parts by weight of the first polyolefin; the co-catalyst in an amount of about 1 to about 4 parts by weight based on 100 parts by weight of the first polyolefin; and the vulcanizing agents in an amount of about 1 to about 3 parts by weight based on 100 parts by weight of the second polyolefin.

In addition to the various components mentioned above, the roofing membrane composition can contain antioxidants, processing aids, light stabilizers, and other conventional additives. These additives can be incorporated into the composition in a total amount of up to about 5 percent by weight based on the weight of the composition.

The invention is illustrated by the following examples. Parts and percentages are by weight.

EXAMPLE I

The formulation and procedure for preparing a silane modified polyethylene is described.

The polyethylene used in this example is a low density polyethylene having a density of 0.90 and a melt index of 1.0. The low density polyethylene can be made by the process described in European Patent Application No. 0 120 503, incorporated by reference herein, wherein ethylene is polymerized together with an alpha olefin comonomer having 3 to 8 carbon atoms or by other conventional techniques. In the present application, low density polyethylenes are considered to include copolymers of ethylene and a minor proportion of alpha olefin.

100 parts of polyethylene, 0.2 part of polymerized 1,3-dihydro-2,2,4-trimethylquinoline (an antioxidant), 0.1 part of dicumyl peroxide, and 4 parts of vinyl tri-2-ethyl-hexoxy silane are mixed in a laboratory Brabender mixer at a temperature in the range of about 80° C. to about 115° C., a temperature low enough to keep the dicumyl peroxide below its decomposition temperature.

After mixing for five minutes, the temperature is raised to a temperature in the range of about 150° C. to about 220° C. The batch is then mixed for 5 to 10 minutes during which grafting of the silane to the polyethylene occurs.

The antioxidant is used as a radical trap to control the amount of crosslinking.

The silane grafted polyethylene is tested for reactivity as follows: 104.3 parts of silane grafted polyethylene is mixed with 0.5 part of dibutyl tin dilaurate or dioctyl tin maleate for five minutes at about 160° C.

A test slab, three inches by seven inches by 0.075 inch thick, is compression molded at about 150° C. from the mixture and then cooled in the mold.

The slab is tested immediately in a rheometer at 182° C. The torque reading is 8 to 10 units. The slab is then placed in water at 70° C. for 48 hours and tested, once more, in a rheometer at 182° C. The torque reading is 40 to 50 units. This indicates that water crosslinking has occurred. The increase in torque units indicates the degree of crosslinking.

EXAMPLE II

Example I is repeated except that 3 parts of vinyl-triisobutoxysilane and 0.1 part of the antioxidant, tetrakis[methylene(3-5-di-tert-butyl-4-hydroxyhydro-cinnamate]methane, are used; initial mixing is in the range of 110° C. to 120° C.; grafting is for 5 minutes at 185° C.; first rheometer test is at 182° C. with same result; slab is immersed in water for 16 hours; and second torque reading is 40 units.

EXAMPLE III

EPDM is an ethylene-propylene-diene terpolymer rubber made up of 70 percent ethylene, 30 percent propylene, and sufficient ethylidene norbornene to provide about 3 to 5 percent unsaturation in the terpolymer rubber.

In samples 1 to 3, a masterbatch of 50 parts EPDM, 150 parts carbon black, and 75 parts paraffin oil is mixed in a Brabender mixer with a silane modified polyethylene and the antioxidant. The silane modified polyethylene is a silane grafted low density polyethylene having a density of 0.90 and a silane content of 1 to 4 percent by weight based on the weight of the polymer. Further, it is curable to a rheometer number of 50. The catalyst masterbatch is then added and mixed with the other components.

The slabs are immersed in water for 16 hours at 70° C. and then used to determine properties. The balance of the samples is also immersed in water for 16 hours at 70° C. The unmolded portion is used to determine viscosity. Viscosities are measured in a rheometer at 182° C. In sample 2, the tetramethoxy titanate is added with the catalyst masterbatch. This co-catalyst is used when fast cures are desired. Part of each sample is molded into a test slab at 180° C.

Compositions, viscosities, and properties are set forth in the Table. The tests used to determine the properties can be found under ASTM D-412.

The procedure with respect to samples 4 to 8 is the same as for samples 1 to 3 except that the EPDM masterbatch is different for each sample. Each EPDM masterbatch includes EPDM, carbon black, and paraffin oil in the amounts noted for each sample in the Table. Further, the water cure is for 74 hours instead of 16 hours. The Vicat temperature is measured in degrees Centigrade for samples 5 through 8. This temperature is the softening point of the first polyolefin.

The procedure used for samples 1 to 3 is used for samples 9 to 11 except that the EPDM masterbatch contains 100 parts of EPDM, 300 parts of carbon black, and 100 parts of paraffin oil.

TABLE

| | Samples | | | | | | | | | | |
|---|---|---|---|---|---|---|---|---|---|---|---|
| | 1 | 2 | 3 | 4 | 5 | 6 | 7 | 8 | 9 | 10 | 11 |
| Components | (parts) | | | | | | | | | | |
| EPDM | 50 | 50 | 50 | 33.3 | 26.6 | 30 | 30 | 23.3 | 20 | 30 | 40 |
| Silane grafted very low density polyethylene | 50 | 50 | 50 | 66.7 | 73.4 | 70 | — | 76.7 | 80 | 70 | 60 |
| Copolymer of ethylene and silane (melt index 3.5) | — | — | — | — | — | — | 70 | — | — | — | — |
| Carbon black | 150 | 150 | 150 | 100 | 80 | 90 | 90 | 70 | 60 | 90 | 120 |
| Paraffin oil | 75 | 75 | 75 | 50 | 40 | 45 | 45 | 35 | 20 | 30 | 40 |
| Polymerized 1,2-dihydro-2,2,4-trimethylquinoline | 0.65 | 0.65 | 0.65 | | | | | | | | |
| Dibutyl tin dilaurate masterbatch (100 parts of polyethylene and 12.5 parts of dibutyl tin dilaurate) | — | 0.3 | 1.9 | 2.7 | 2.9 | 2.8 | 2.8 | 2.9 | 2.9 | 2.9 | 2.9 |
| Tetramethoxy titanate | — | 2.0 | — | — | — | — | — | — | — | — | — |
| Viscosity | (rheometer number) | | | | | | | | | | |
| Before water immersion | 4 | 11 | 7 | 8 | 9 | 10 | 41 | 11 | 17 | 18 | 18 |

TABLE-continued

| | Samples | | | | | | | | | | |
|---|---|---|---|---|---|---|---|---|---|---|---|
| | 1 | 2 | 3 | 4 | 5 | 6 | 7 | 8 | 9 | 10 | 11 |
| After water immersion | — | 13 | 14 | 23 | 32 | 25 | 46 | 22 | 29 | 26 | 23 |
| Properties | | | | | | | | | | | |
| Stress at 100% elongation, psi | 435 | 615 | 480 | 765 | 805 | 865 | 1240 | 1185 | 1165 | 900 | 840 |
| Stress at 300% elongation, psi | 705 | 830 | 785 | 1100 | 1170 | 1160 | — | 1360 | 1465 | 1320 | 1140 |
| Tensile strength, psi | 820 | 855 | 865 | 1210 | 1350 | 1260 | 1440 | 1505 | 1650 | 1425 | 1270 |
| Percent elongation | 595 | 385 | 545 | 505 | 485 | 470 | 175 | 440 | 410 | 380 | 390 |
| Shore A Hardness | 79 | 82 | 79 | 83 | 86 | 85 | 89 | 90 | 93 | 92 | 89 |
| Vicat Temperature, °C. | — | — | — | — | 72.5 | 75.5 | 78.8 | 79.3 | — | — | — |

I claim:

1. A roofing membrane composition comprising:
   (a) a hydrolyzable polyolefin having a density less than or equal to 0.92 selected from the group consisting of (i) a copolymer of ethylene and silane and (ii) a silane modified polyethylene wherein, in (i) and (ii), the silane is present in an amount of about 0.5 to about 10 percent by weight based on the weight of the polyolefin, said polyolefin being present in the composition in an amount of about 20 to about 90 percent by weight based on the combined weight of components (a) and (b);
   (b) an ethylene-propylene-diene terpolymer rubber, said terpolymer rubber containing about 30 to about 85 percent by weight ethylene, about 15 to about 70 percent by weight propylene, and about 1 to about 10 percent by weight diene, all percentages based on the weight of the terpolymer rubber, said terpolymer rubber being present in the composition in an amount of about 10 to about 80 percent by weight based on the combined weight of components (a) and (b);
   (c) a particulate filler selected from the group consisting of carbon black and non-black reinforcing fillers, and mixtures thereof, said filler being present in the composition in an amount of about 10 to about 200 parts by weight per hundred parts by weight of components (a) and (b) combined; and
   (d) a compound suitable for roofing membranes selected from the group consisting of paraffin oils, naphthenic oils, and liquid polybutene, said compound being present in the composition in an amount of about 10 to about 100 parts by weight per hundred parts by weight of components (a) and (b).

2. The roofing membrane composition defined in claim 1 wherein:
   (i) the silane is present in the polyolefin in an amount of about 0.5 to about 4 percent by weight;
   (ii) the polyolefin is present in an amount of about 40 to about 80 percent by weight;
   (iii) the ethylene-propylene-diene terpolymer rubber contains about 50 to about 75 percent by weight ethylene, about 20 to about 40 percent by weight propylene, and about 2 to about 8 percent by weight diene;
   (iv) the terpolymer rubber is present in an amount of about 20 to about 60 percent by weight;
   (v) the filler is present in an amount of about 60 to about 150 parts by weight; and
   (vi) the compound is present in an amount of about 20 to about 80 parts by weight.

* * * * *